(12) United States Patent
Verhoog et al.

(10) Patent No.: US 7,207,888 B2
(45) Date of Patent: Apr. 24, 2007

(54) TORSIONAL VIBRATION DAMPING DEVICE FOR MOTOR VEHICLE CLUTCH

(75) Inventors: Roël Verhoog, Gournay sur Aronde (FR); Daniel Bonnel, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/181,055

(22) PCT Filed: Nov. 12, 2001

(86) PCT No.: PCT/FR01/03529

§ 371 (c)(1),
(2), (4) Date: Jul. 12, 2002

(87) PCT Pub. No.: WO02/38980

PCT Pub. Date: May 16, 2002

(65) Prior Publication Data

US 2003/0032487 A1    Feb. 13, 2003

(30) Foreign Application Priority Data

Nov. 13, 2000  (FR) .................................. 00 14525

(51) Int. Cl.
*F16D 3/00* (2006.01)
*F16D 3/14* (2006.01)

(52) U.S. Cl. ................... 464/67.1; 464/66.1; 464/68.9; 192/203; 192/212; 192/329; 192/70.17

(58) Field of Classification Search ................. 464/66, 464/67, 68, 66.1, 67.1, 68.9; 192/203, 212, 192/329, 70.17
See application file for complete search history.

(56) References Cited

U.S. PATENT DOCUMENTS

| | | | |
|---|---|---|---|
| 1,889,698 A | 11/1932 | Reed | |
| 4,451,244 A | 5/1984 | Lamarche | |
| 4,518,071 A | 5/1985 | Nozawa | |
| 4,702,721 A * | 10/1987 | Lamarche | 464/67 |
| 4,867,290 A * | 9/1989 | Macdonald et al. | 192/3.28 |
| 5,411,439 A | 5/1995 | Sacher | |
| 5,687,828 A | 11/1997 | Ament et al. | |
| 5,743,365 A * | 4/1998 | Makino | 464/66 |
| 5,882,264 A * | 3/1999 | Yabe et al. | 464/66 |
| 5,934,426 A * | 8/1999 | Hinkel et al. | 464/67 |
| 5,996,761 A * | 12/1999 | Teramae | 464/66 |
| 6,056,102 A * | 5/2000 | Ohkubo et al. | 464/67 |
| 6,244,401 B1 * | 6/2001 | Maienschein et al. | 464/66 |
| 6,280,333 B1 * | 8/2001 | Thevenon | 464/68 |
| 6,354,420 B1 * | 3/2002 | Yabe | 464/67 |

* cited by examiner

*Primary Examiner*—Daniel P. Stodola
*Assistant Examiner*—Victor MacArthur
(74) *Attorney, Agent, or Firm*—Berenato, White & Stavish

(57) ABSTRACT

A torsional vibration damping device (1), in particular for a motor vehicle clutch, said device comprising a disc (60) and a support (80) mounted mobile in rotation relative to each other about a common main axis, and linked in rotation via circumferential elastic members (90) damping torsional vibrations, said elastic members being interposed between the disc (60) and the support (80) and maintained in position circumferentially via lugs (65) of the disc (60) and lugs (82,84) of the support (80) whereon are supported the elastic members (90) and radially via a guide ring (100) passing through the elastic members (90) and integral with the disc (60). Said device is characterised in that the lugs (82,84) of the support (80) are mounted on either side of a section of the ring (100) and the lugs (65) of the disc (60) can move freely at the angle between the lugs (82,84) of the support (80).

25 Claims, 17 Drawing Sheets

TORSIONAL VIBRATION DAMPING DEVICE FOR MOTOR VEHICLE CLUTCH

Figure 1:
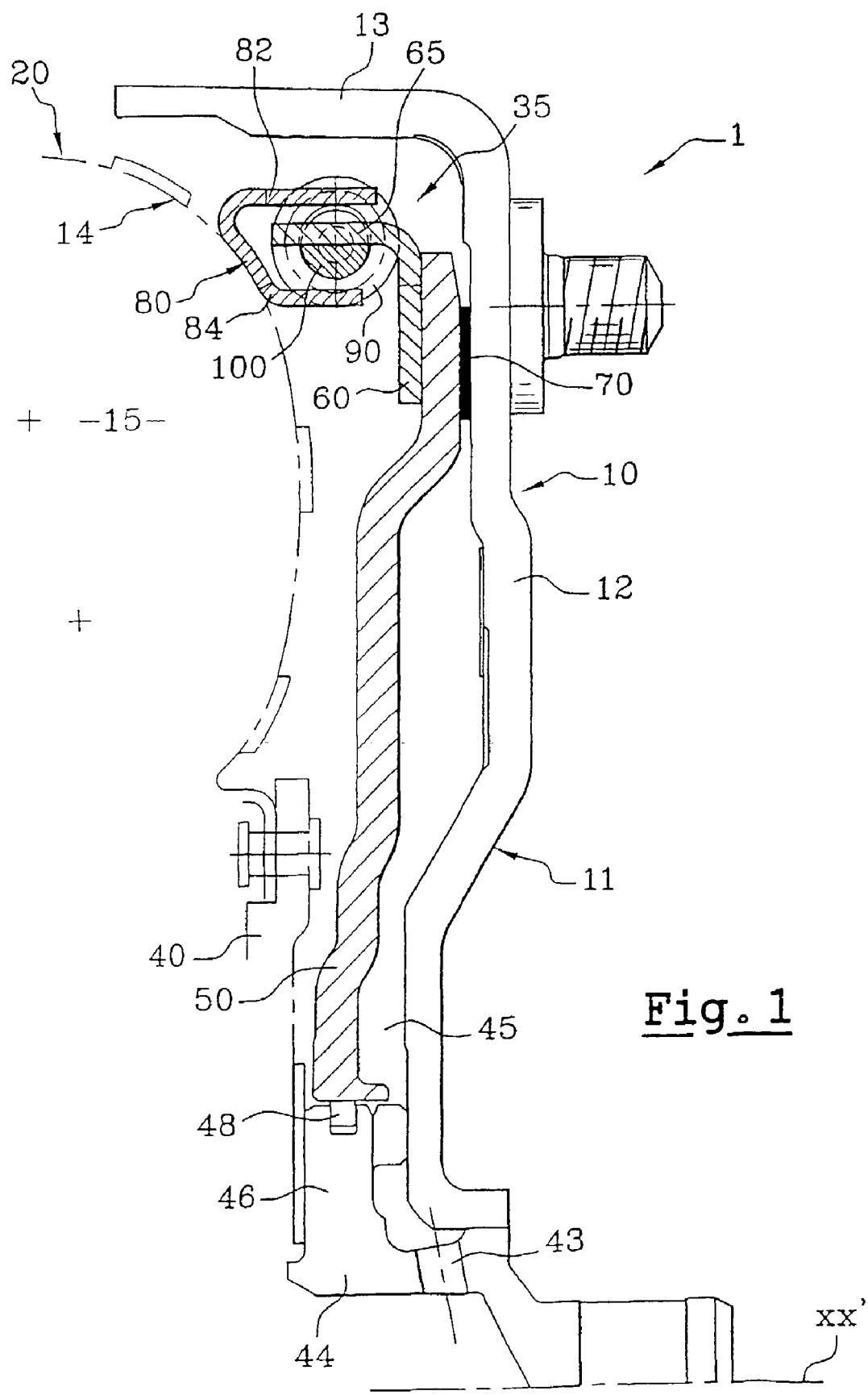

The present invention relates to a torsional-vibration damping device for a motor-vehicle clutch, and in particular for a locking clutch of a hydrokinetic coupling apparatus.

A locking clutch (usually called "Lock-Up") in the case of a hydrokinetic coupling apparatus acting between a drive element and a driven element for a motor vehicle, especially comprises a torsion damper, an axially movable piston, at least one friction lining suitable for being clamped between the said piston and a transverse wall integral with the driven element.

The torsion damper includes an input part, an output part and circumferentially-acting elastic members, for example springs, interposed between the said parts so as to couple them and absorb the vibrations.

In fact, it is known that a motor-vehicle engine operates in jerks (often imperceptible to the user) because of the very design of the thermodynamic cycle which occurs within the cylinders in order to transmit the power to the crankshaft. The torque on the engine shaft therefore follows a substantially sinusoidal curve corresponding to the alternate phases of pressure-release and of compression of the various pistons in the cylinders. A phenomenon of vibration of the pieces coupled to the engine, either directly or indirectly, then ensues. This torsion damper makes it possible to limit the transmission of vibrations given off by the engine, whether this is at standstill with the gearbox in neutral, or moving forward at low rotational speeds of the engine.

In the solutions of the prior art, springs are interposed circumferentially between end stops carried by each of two input and output pieces. The torque is transmitted from one piece to the other by way of springs which are tasked with absorbing the jolts of the transmission so that the driven shaft turns in a more uniform way. It is thus known to arrange these compression springs around a guide tube forming a circumferential ring (inside guidance is then spoken of). The patents U.S. Pat. Nos. 1,334,537 and 5,411,439 describe such layouts.

However, these devices do not give complete satisfaction, especially by reason of the fact that the design of the end stops and their position with respect to the springs do not allow correct balancing of the stresses exerted on them as well as correct centring of the springs and thus correct damping of the vibrations.

Moreover, in all these devices, the springs are not all compressed at the same time in one direction or the other. They are compressed in groups, one group in one rotational direction, one group in the other direction. This results in a loss of effectiveness and above all very poor management of the working volume of the device with respect to the desired damping.

Furthermore, problems very often persist due to the high rotation of the pieces in motion and to the centrifugal force induced, which has a tendency to off-centre the springs and to disturb their operation. It is therefore possible to improve the effectiveness of such devices.

One object of the present invention is therefore especially to solve at least some of these problems by proposing a solution which is simple to implement, compact, reliable and inexpensive.

To that end, the invention relates to a torsional-vibration damping device, in particular for a motor-vehicle clutch, the said device comprising a web and a support which are mounted movable in rotation with respect to one another about the same main axis, and are linked in rotation by way of elastic members for damping the torsional vibrations, the said elastic members being interposed between the web and the support and held in position, on the one hand circumferentially, by way of claws of the web and of claws of the support on which the elastic members bear, and, and the other hand radially, by way of a guide ring passing through the elastic members and integral with the web, the device being characterised in that the claws of the support are mounted on either side of a section of the guide ring, and in that the claws of the web can travel freely in angle between the claws of the support.

Hence, the guiding of the elastic members is carried out in a more balanced way than in the prior art, consequently providing for better absorption of the torsional vibrations of the device.

Advantageously, the claws of the web and the claws of the support will be of axial orientation, the claws of the support moreover being grouped into pairs each forming a U.

In order to reduce the bulk of the device without any loss of effectiveness, each claw of the web will preferably lie within the diameter of the guide ring, without projecting radially from it.

In order to better distribute the load over the elastic members, each claw of the web will bear on two substantially diametrally opposite points of the extremities of the elastic members.

In a general way, the guide ring will locally exhibit areas where its thickness will be reduced radially in order to define hollow housings, and each claw of the web will then be placed in an associated housing so as to bear against the extremities of the elastic members.

By way of example, the guide ring could be of substantially circular cross-section and be flattened locally so as to define the said housings.

According to another embodiment which, in particular, makes it possible to lighten the device, the guide ring could be hollow and, in order to form the housings, be flattened locally onto itself, reversing its concavity so as to have a kidney-bean-shaped cross-section.

In order to reduce the friction between the ring and the guide members, in particular because of the centrifugal forces in play, the ring could, moreover, be flattened substantially opposite the housings and over its entire periphery in order to exhibit two lines of contact with the elastic members.

Advantageously, the elastic members will be prestressed at rest between two successive pairs of claws of the support, these claws then being arranged, in this rest state, substantially opposite the claws of the web.

According to one embodiment, the guide ring could be flattened locally over its outer periphery so as to define the housings, and the outer claw of each pair of claws of the support could then be arranged radially beyond each claw of the web which is associated with it in order to be able to pass above it while remaining in contact with the extremities of the elastic members when the web and the support turn with respect to one another.

According to another embodiment, the guide ring could be flattened locally over its inner periphery so as to define the housings, and the inner claw of each pair of claws of the support could then be arranged radially in front of each claw of the web which is associated with it, in order to be able to pass below it while remaining in contact with the extremities of the elastic members when the web and the support turn with respect to one another.

So as to enhance the damping of the vibrations, the device could comprise a set of peripheral elastic members combined with a set of central elastic members.

So as to provide variable damping as a function of the rotational speed of the pieces, the peripheral elastic members will preferably be arranged between the claws of the support and the claws of the web so as not to operate in parallel with the central springs except when a threshold torque is reached between the support and the web.

The stiffness of the peripheral elastic members will preferably be greater than that of the central elastic members.

Advantageously, the width of the claws of the web which interact with the first set of elastic members will lie within an angular sector which is smaller than the angular sector in which lies the width of the claws of the web which interact with the second set of elastic members.

In a general way, the width of the claws of the web could lie within an angular sector which is smaller than the angular sector in which lies the width of the claws of the support, in such a way that, at rest, there is an angular clearance between the claws of the web and the extremities of the successive elastic members.

So as to enhance the centring of the elastic members and to better distribute the force with which they bear against the claws of the support, a protection washer could be is [sic] interposed between the extremities of each elastic member and the claws of the support.

The washer will preferably feature a shoulder projecting towards the inside of the elastic members.

In general, the claws of the web will be welded to the inside of the housings of the guide ring.

In particular, the claws of the web will be equipped with inner roughnesses for welding them by electrical resistance welding into the said housings.

In general, the guide ring could feature a slot for putting it in place within the elastic members during assembly.

One of the claws of the web will preferably be welded straddling the two extremities of the guide ring which are separated by the slot.

So as further to reduce the friction of the elastic members on the guide ring, in particular when the elastic members are very long, provision is made for at least one substantially cylindrical guide to be interposed locally between the ring and each elastic member, preferably in a central region thereof.

In order to be able to place this guide easily into the elastic member, while avoiding it being displaced along the ring, the guide will be made of synthetic material and will feature radial bosses.

In particular, the bosses could be mounted elastically on the guide so as to facilitate their fitting within the elastic members, especially when they are helical springs.

Advantageously, with the elastic members being helical springs, the turns of the extremities of the said springs could be shrunk and/or the turns of the extremities of the said springs could have a reduced wire-winding diameter.

According to another embodiment, the guide ring could be traversed by axial orifices in which the claws of the web are mounted.

Figure 2:
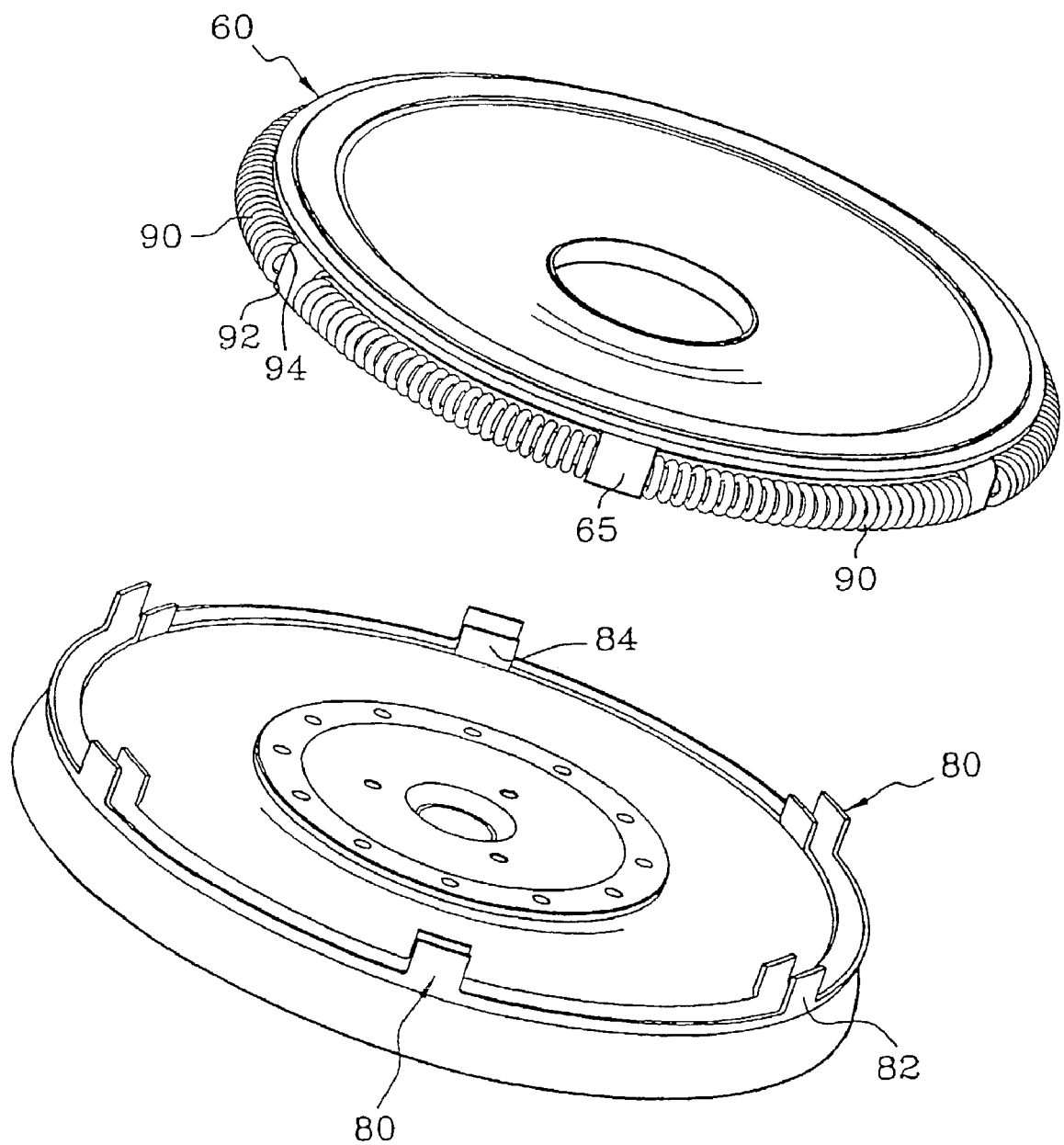
Figure 3:
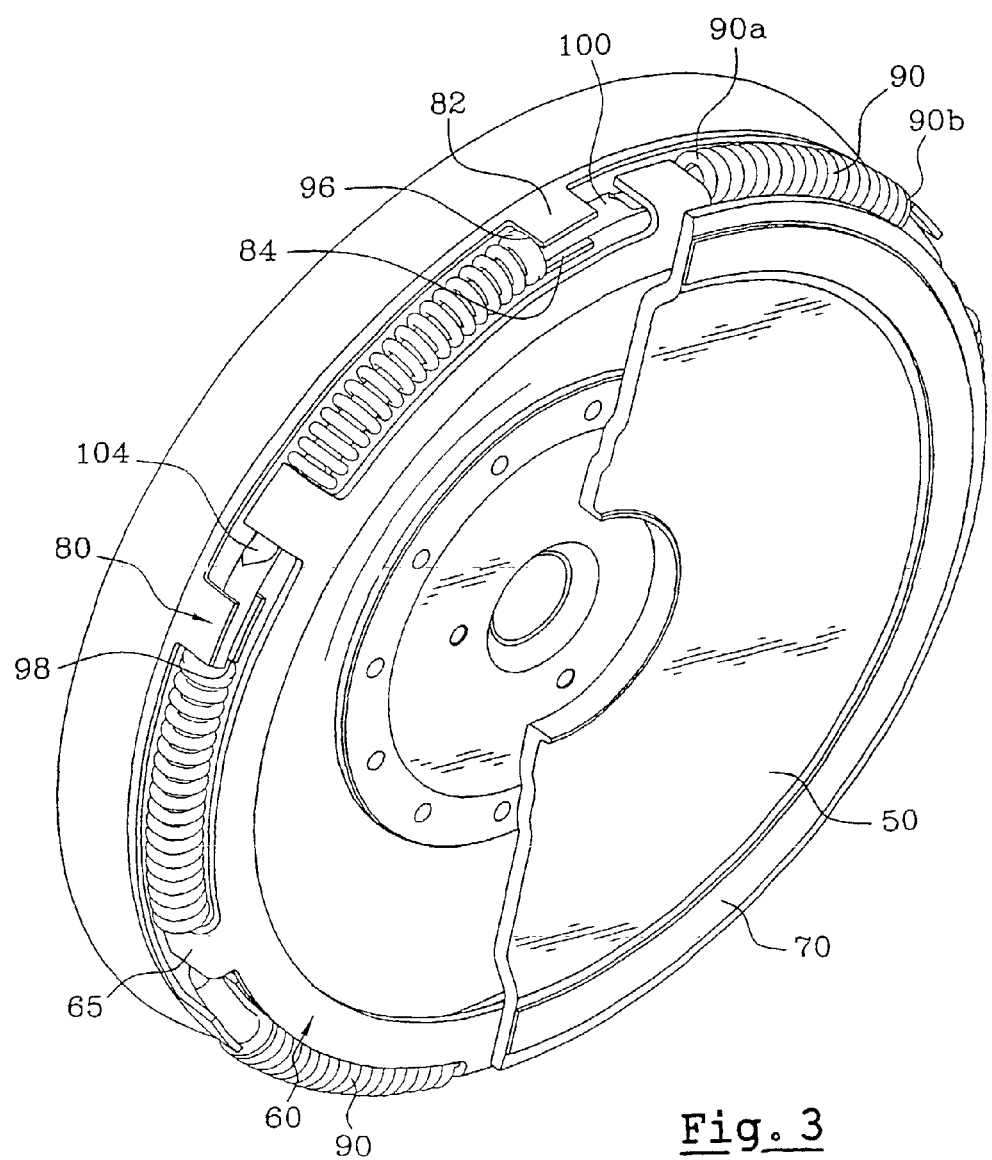

Other details, advantages and characteristics of the invention will emerge upon reading the description which follows, given by way of example with reference to the attached drawings, in which:

FIG. 1 is a sectional view of a first embodiment of a torsional-vibration damping device according to the invention, FIG. 2 is an exploded view in perspective of FIG. 1, FIG. 3 is another view in perspective, with partial cut away, of FIG. 1

Figure 4:
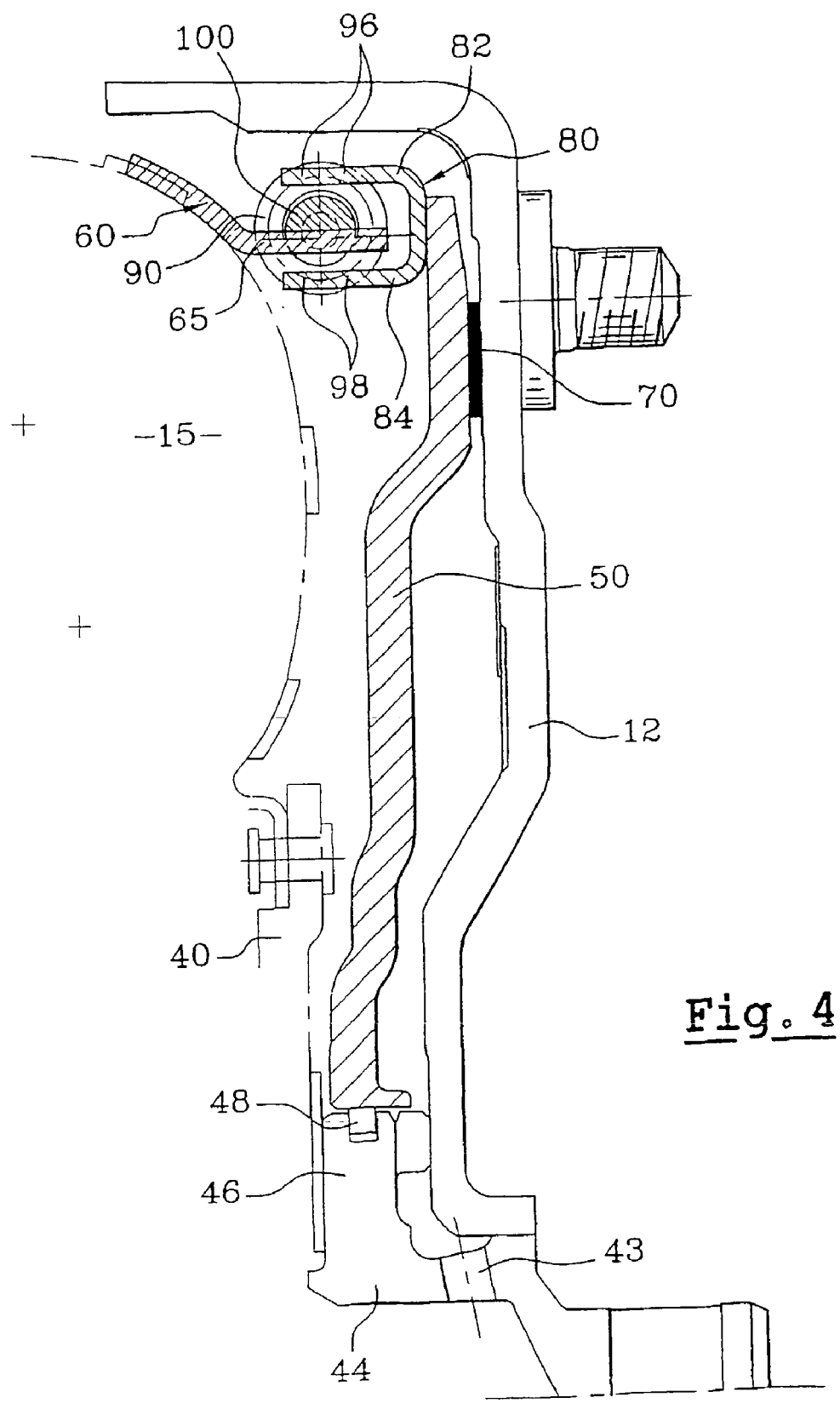
Figure 5:
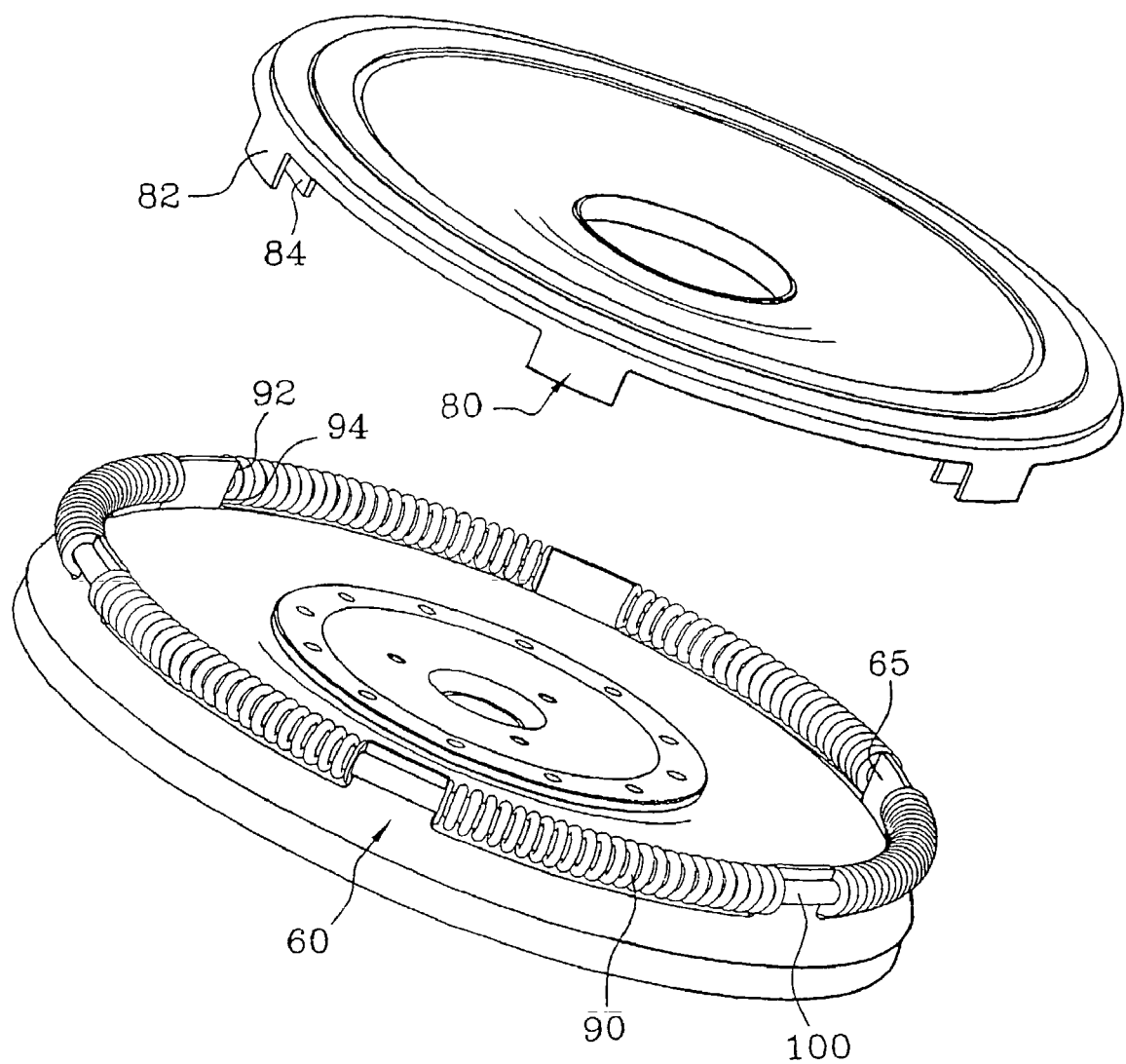
Figure 6:
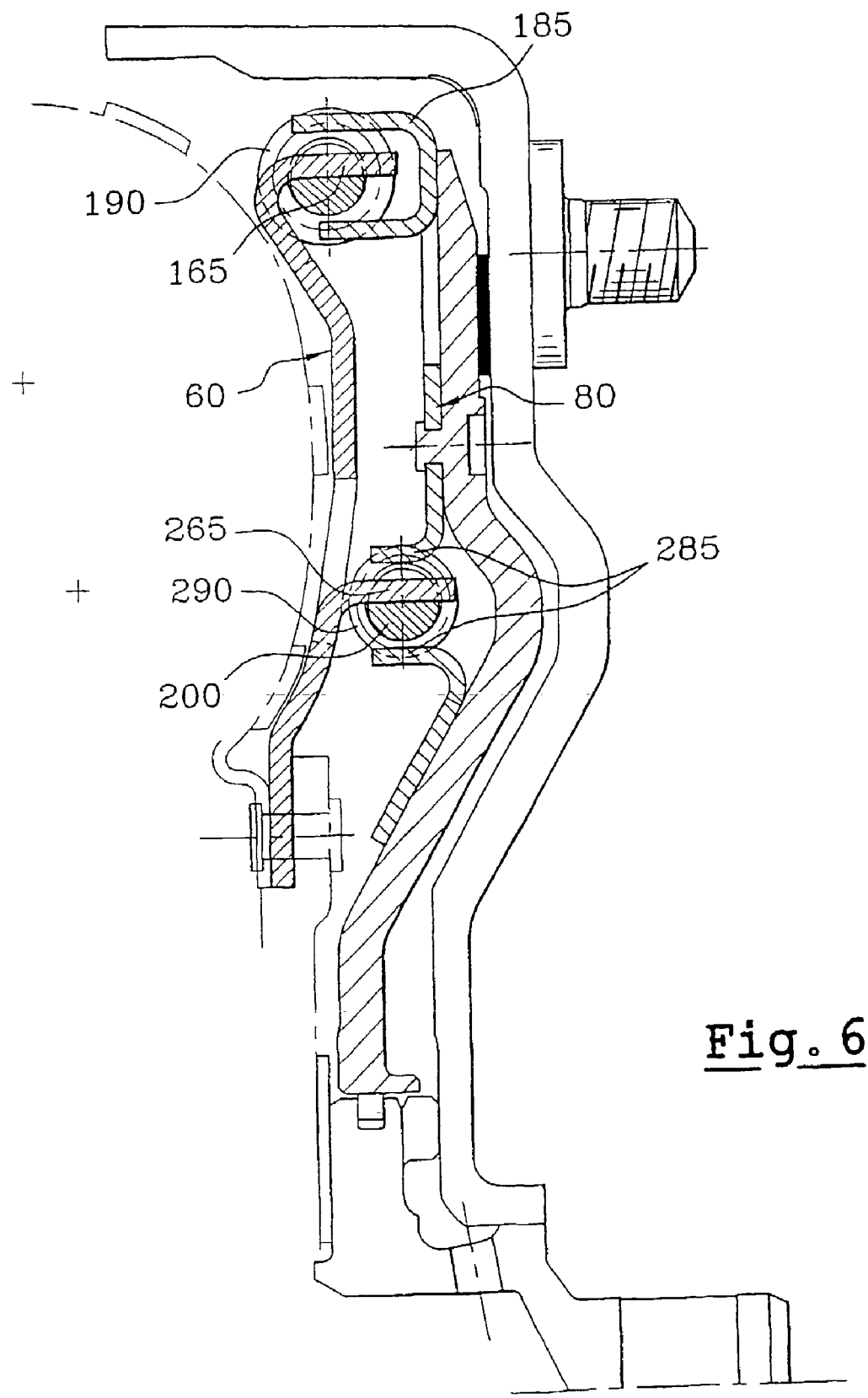
Figure 7:
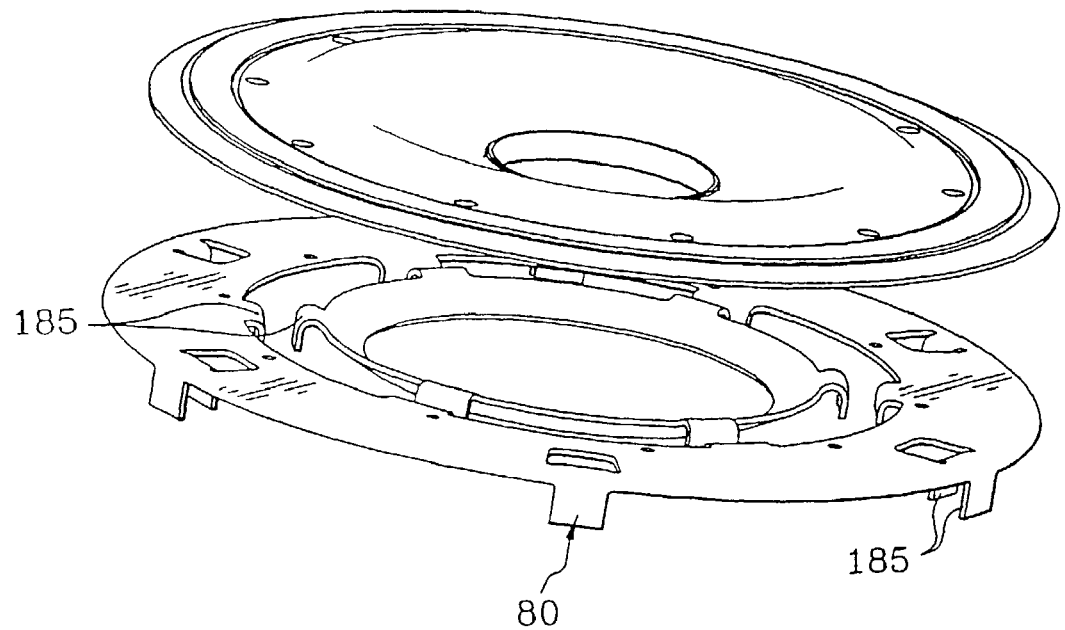
Figure 7:
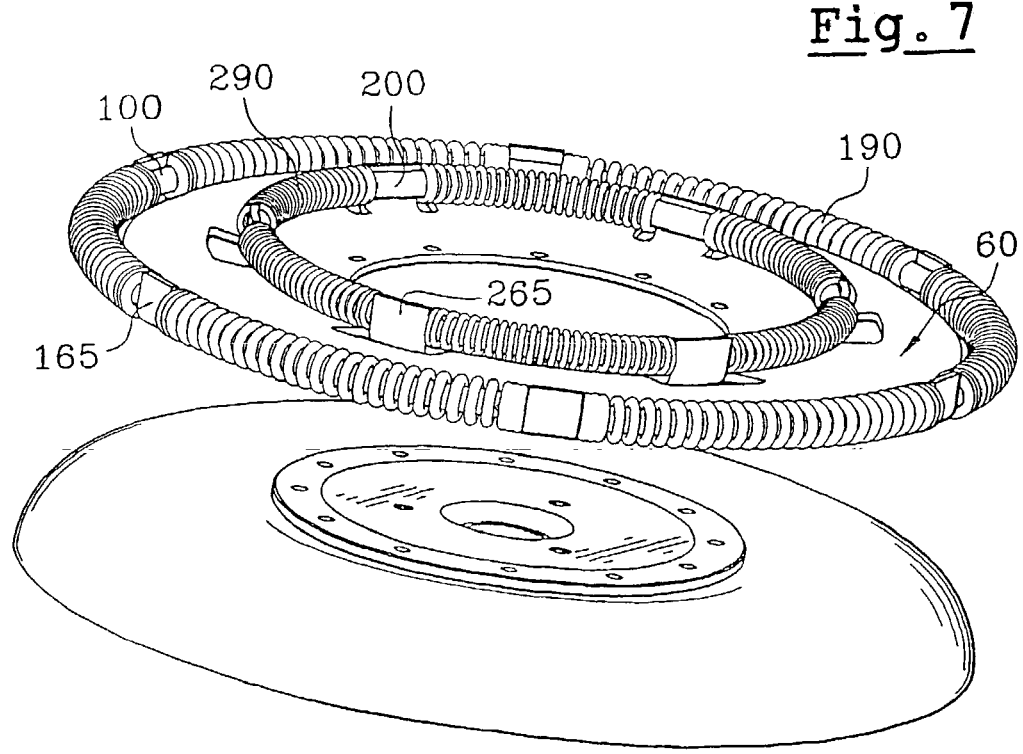
Figure 8:
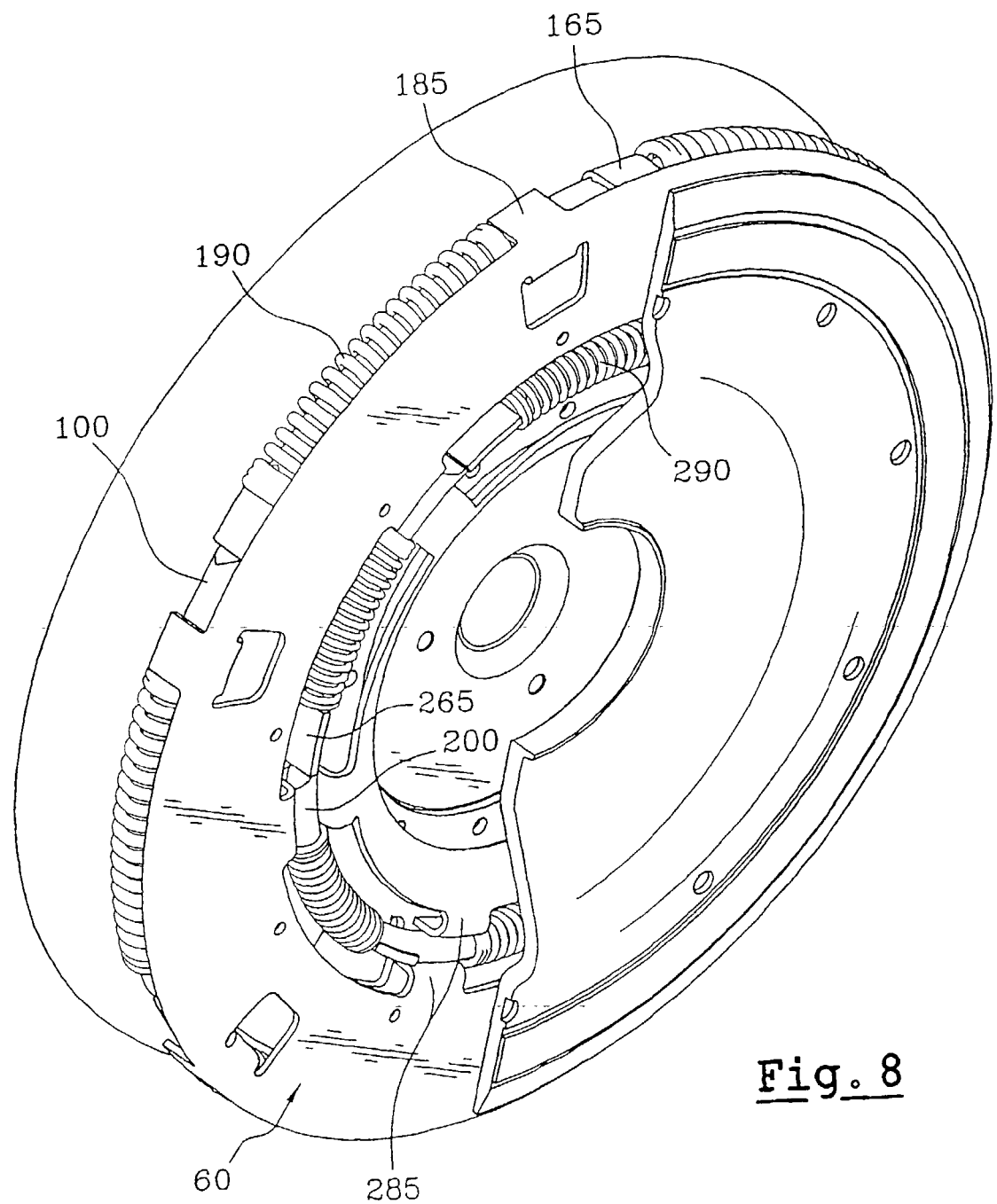
Figure 9:
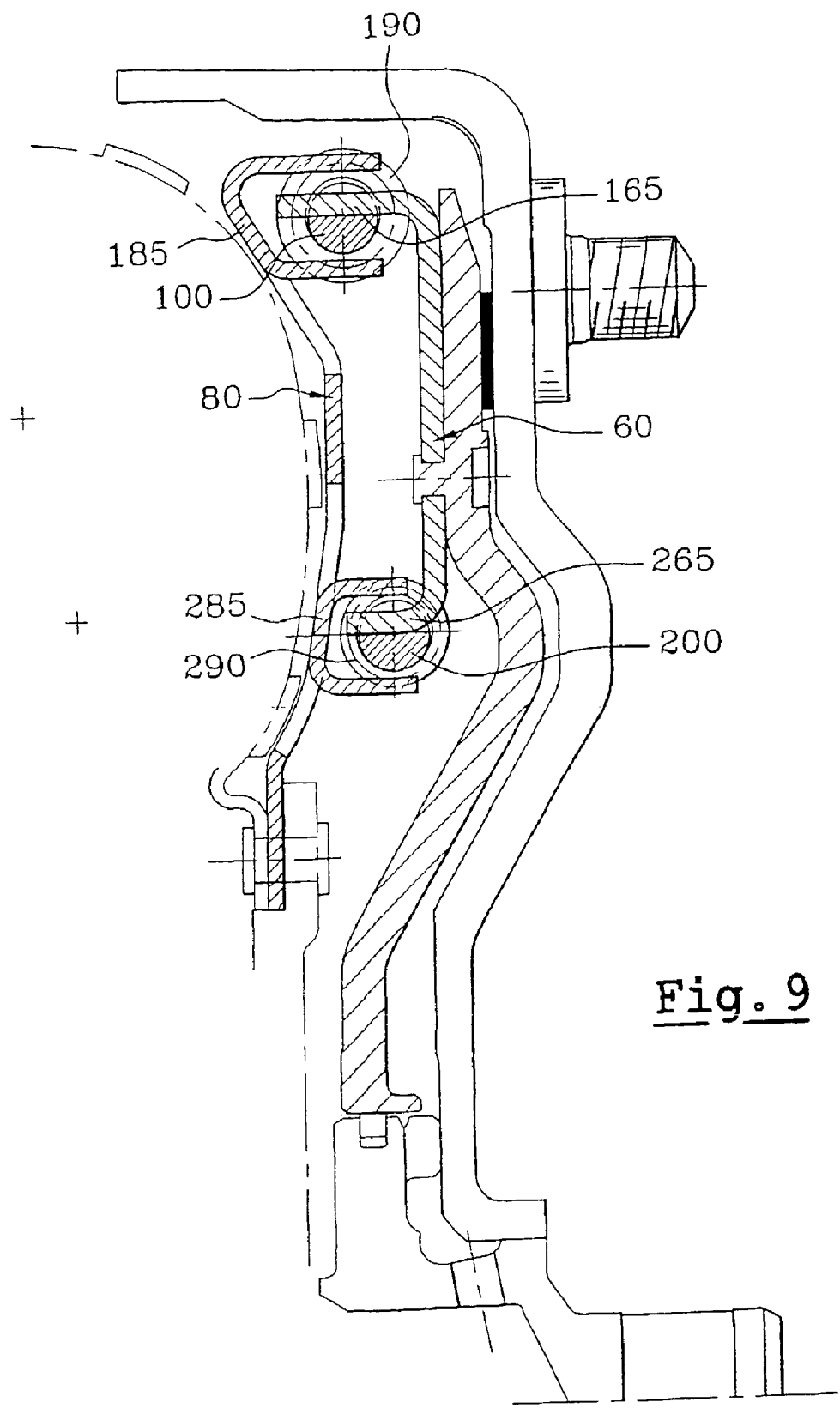
Figure 10:
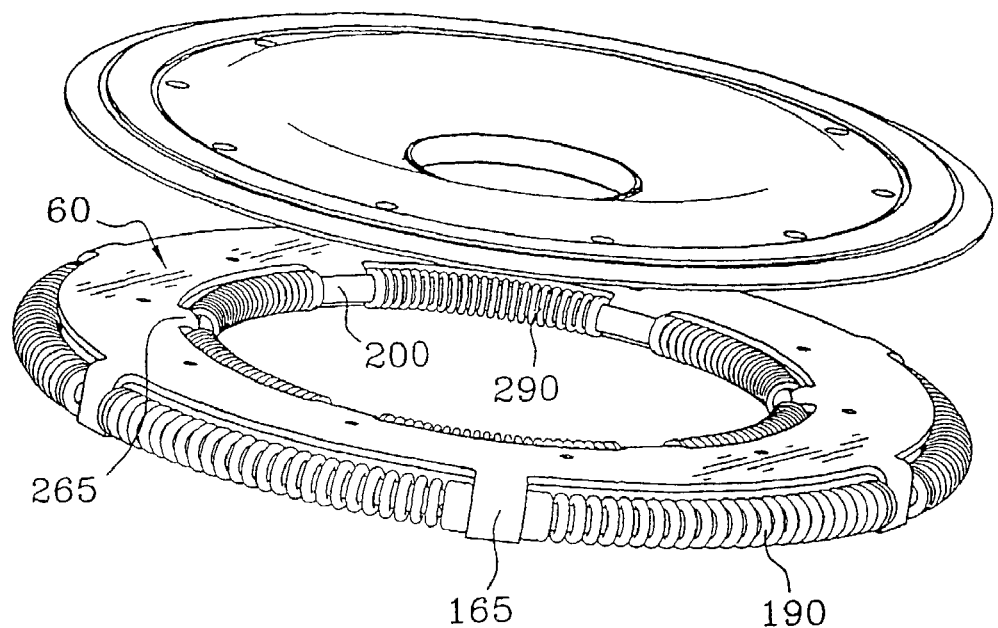
Figure 10:
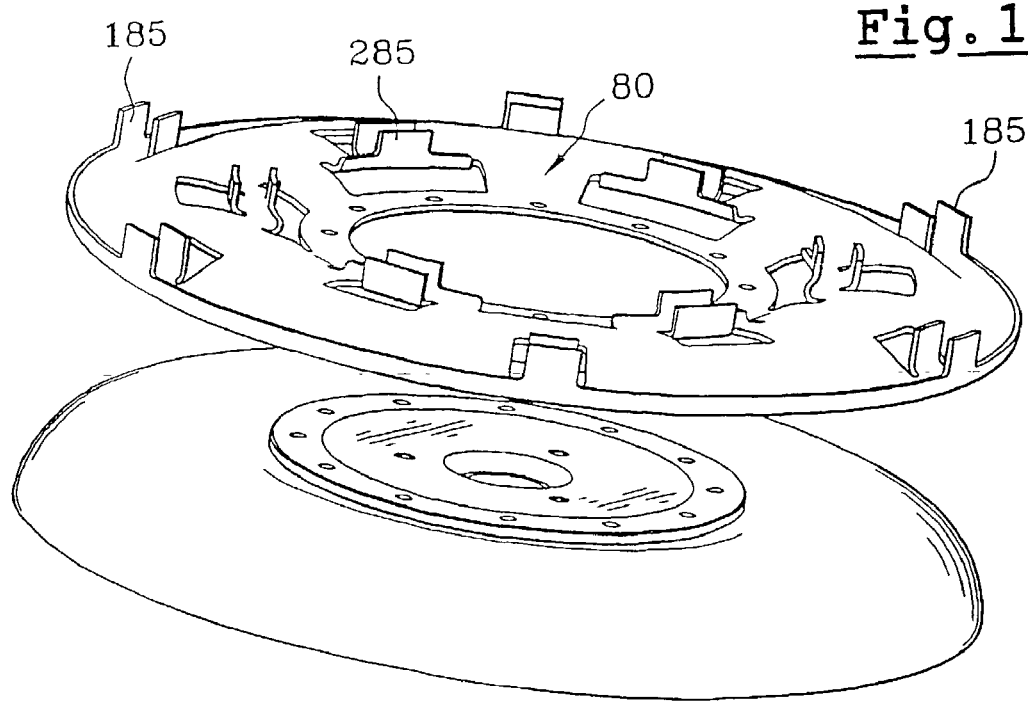
Figure 11:
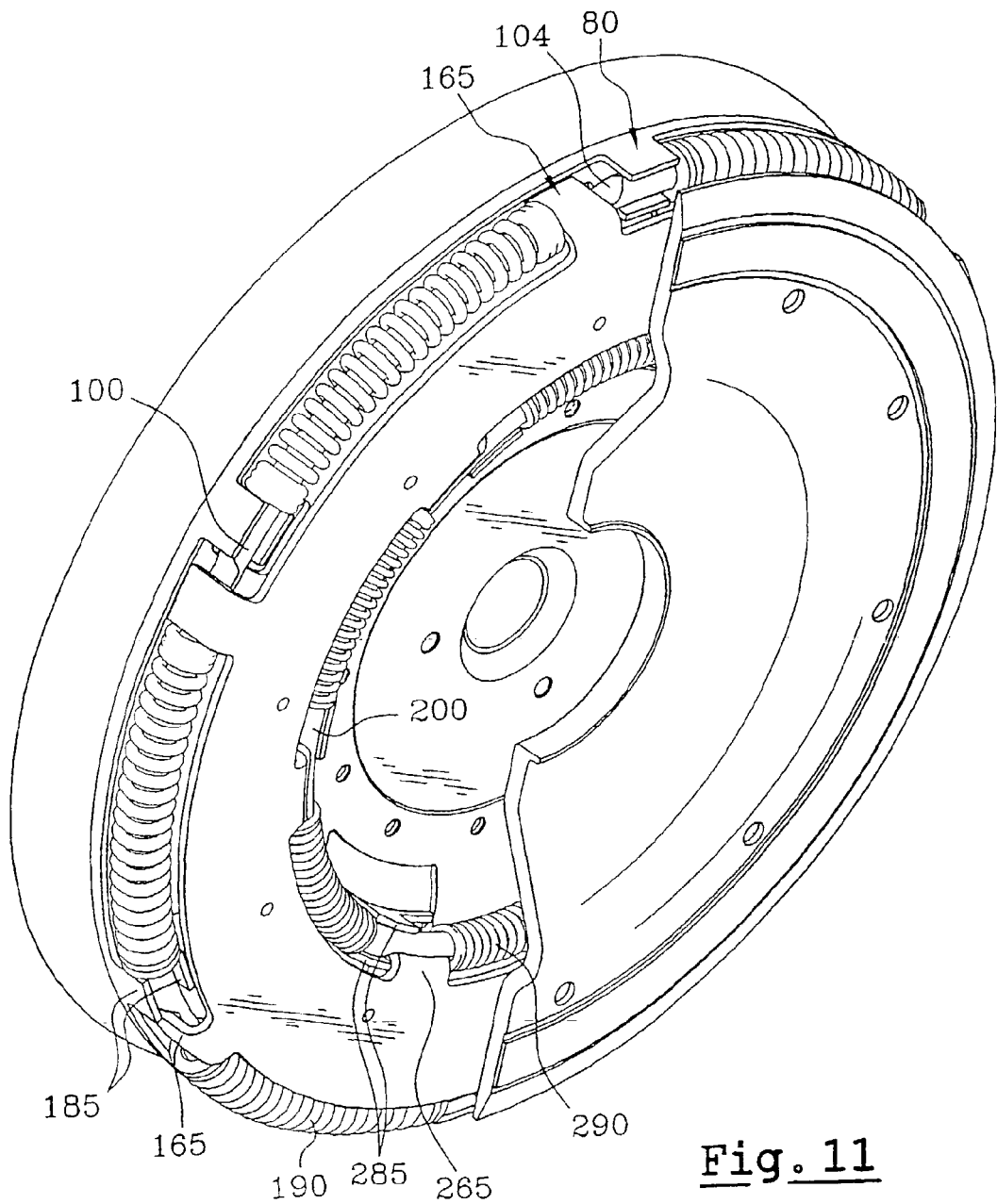
Figure 12:
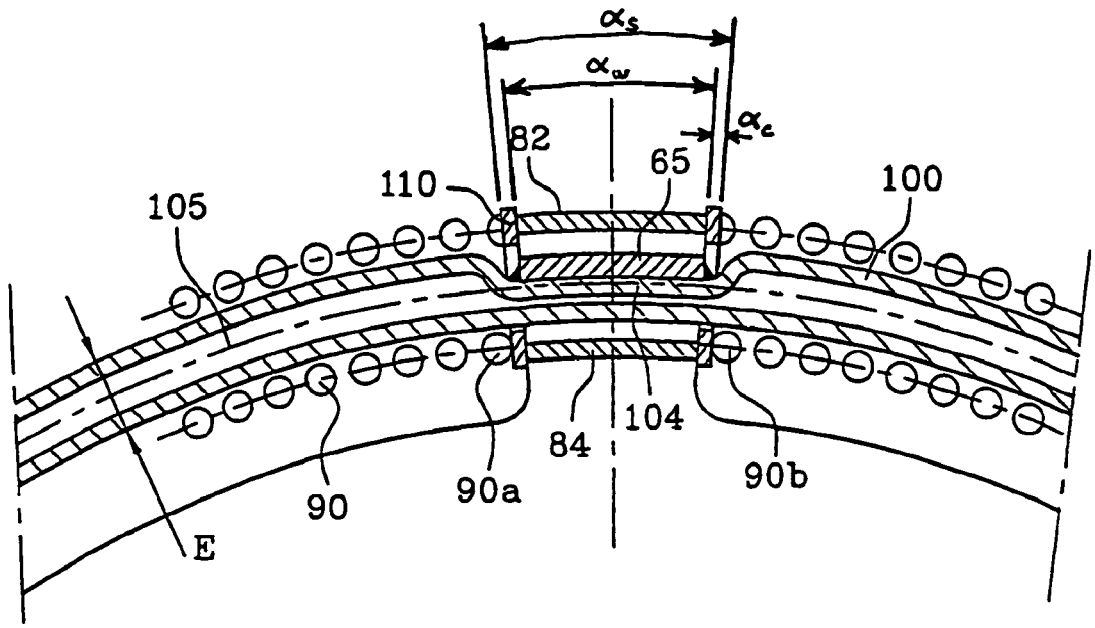
Figure 13:
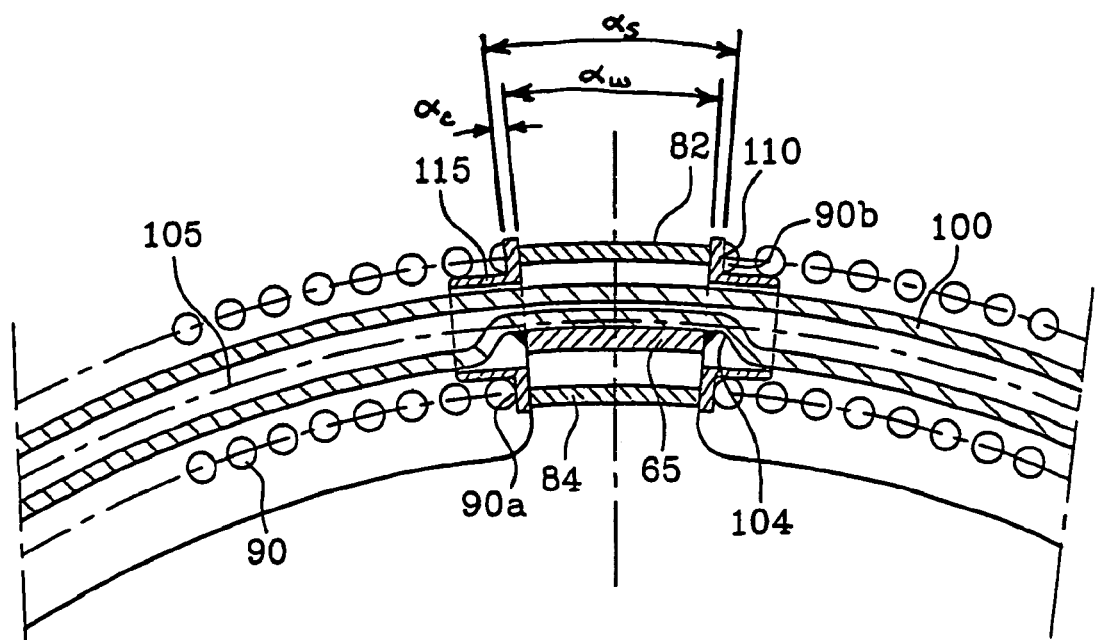
Figure 14:
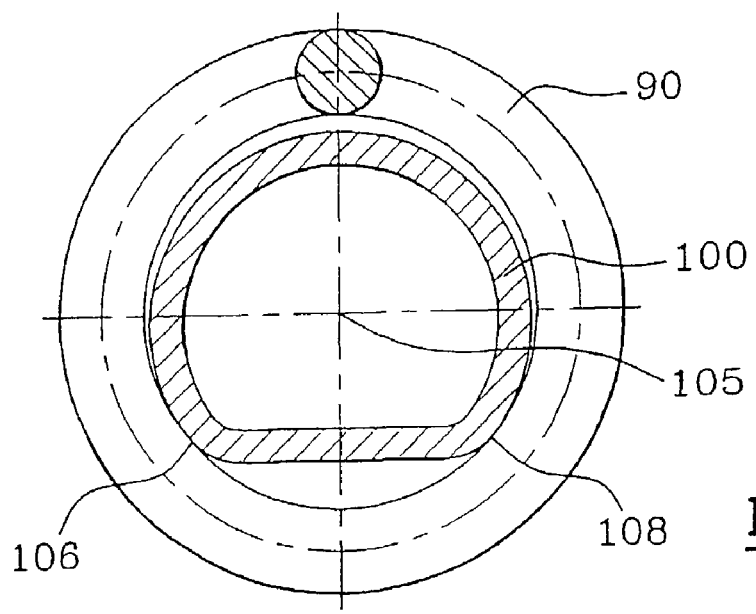
Figure 15:
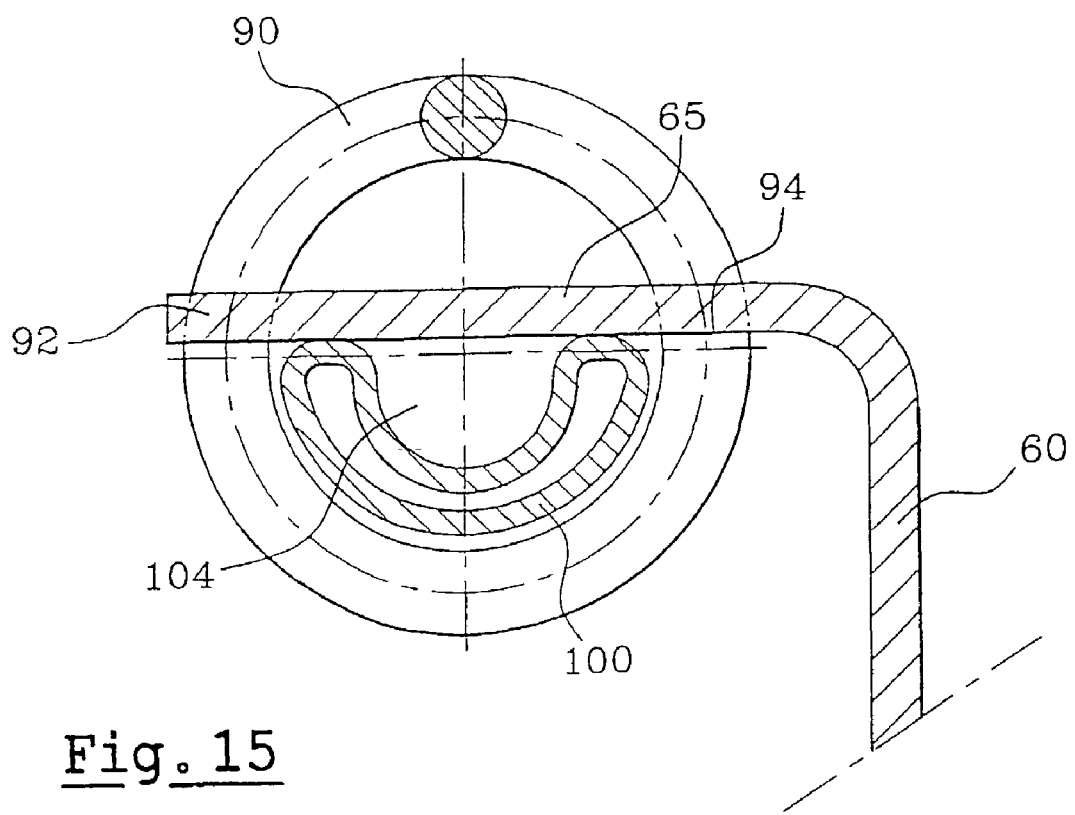
Figure 16:
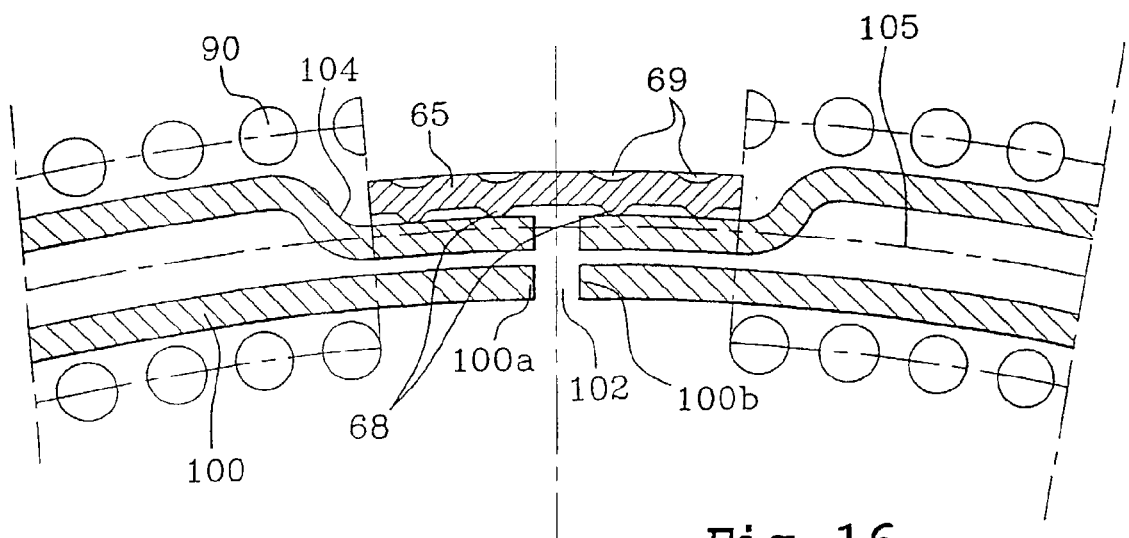
Figure 17:
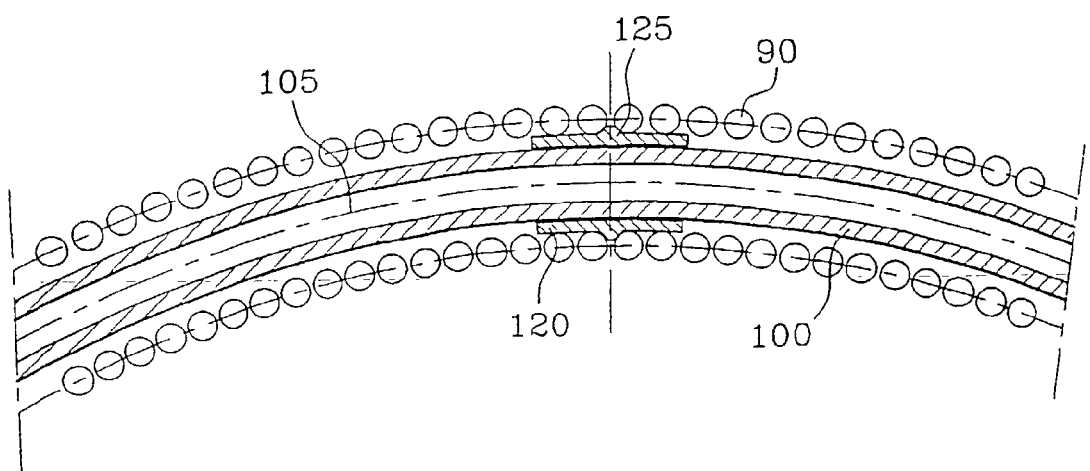
Figure 18:
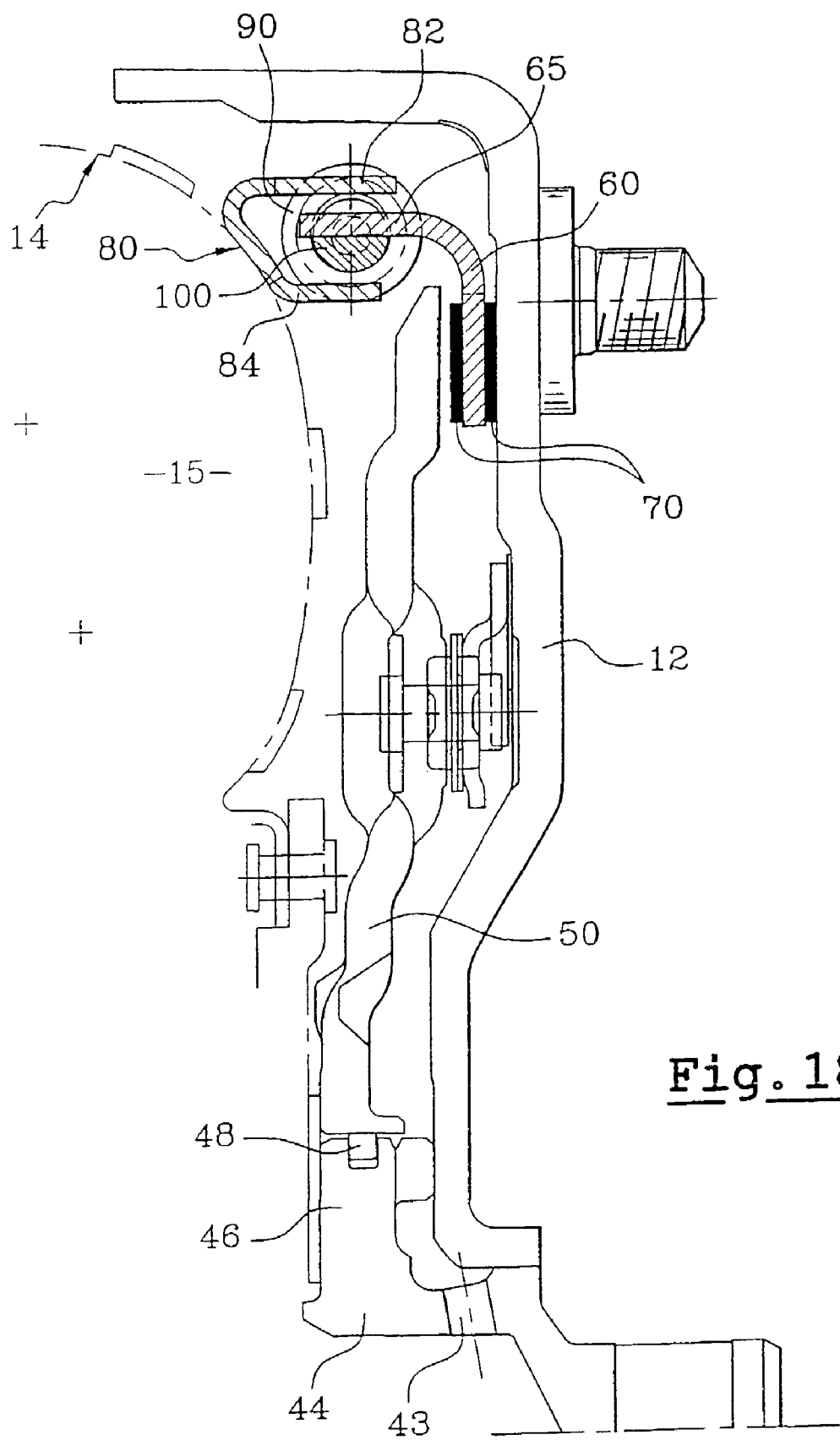
Figure 19:
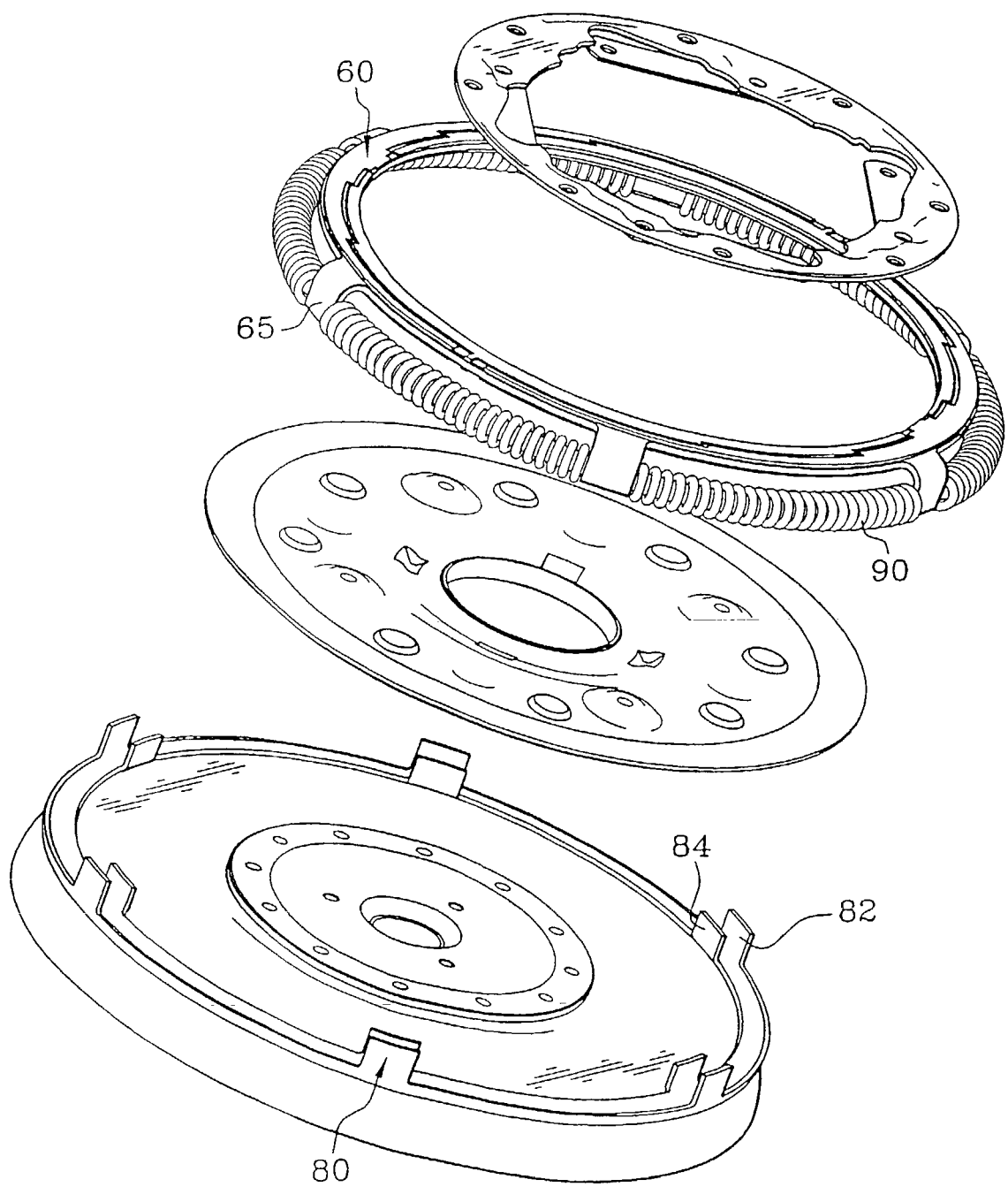
Figure 20:
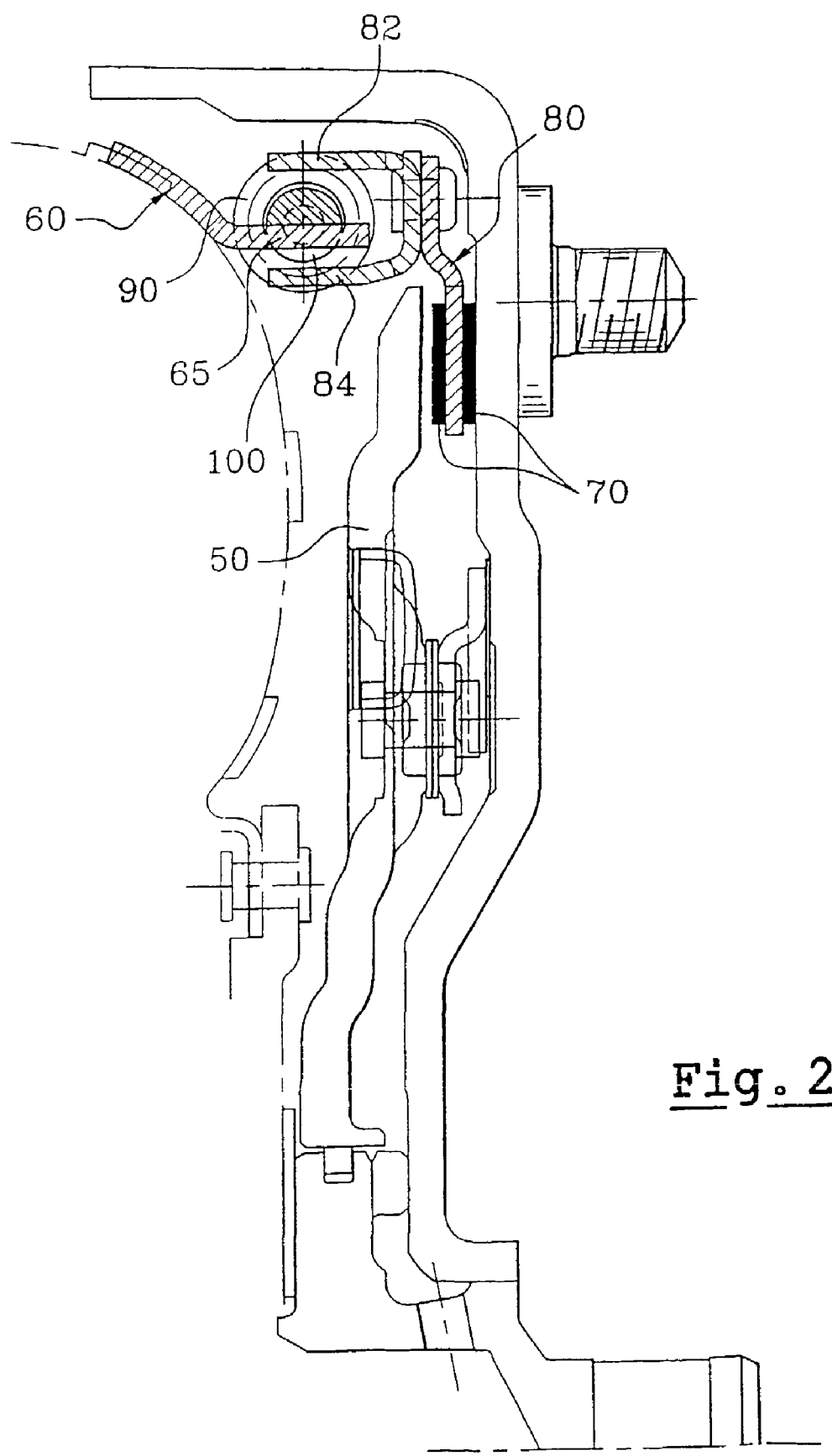

FIG. 4 is a sectional view of an embodiment variant of FIGS. 1 to 3, FIG. 5 is an exploded view in perspective of FIG. 4, FIG. 6 is a sectional view of another embodiment of the torsional-vibration damping device according to the invention, FIG. 7 is an exploded view in perspective of FIG. 6, FIG. 8 is another view in perspective, with partial cut away, of FIG. 7, FIG. 9 is a sectional view of an embodiment variant of FIGS. 6 to 8, FIG. 10 is an exploded view in perspective of FIG. 9, FIG. 11 is another view in perspective with partial cut away of FIG. 9, FIG. 12 is a view of a detail of the invention, FIG. 13 is a view of a detail of an embodiment variant of FIG. 12, FIG. 14 is a sectional view of a detail of another part of the invention, FIG. 15 is another sectional view of a detail of the invention, FIG. 16 is another view of a detail of the invention, FIG. 17 is another view of a detail of the invention, FIG. 18 is a sectional view of another embodiment of the invention, FIG. 19 is an exploded view in perspective of FIG. 18, and FIG. 20 is a sectional view of an embodiment variant of FIGS. 18 and 19.

In FIG. 1 is represented a part of a hydrokinetic coupling device 1 for a motor-vehicle engine. This device 1 comprises, arranged in a leaktight box 10 forming an oil sump, a torque converter 20 and a locking clutch.

This sump 10, here of metal, forms a drive element and is able to be linked in rotation about an axis xx' to a drive shaft, namely to the crankshaft (not represented) of an internal-combustion engine of the motor vehicle the transmission of which includes such a hydrokinetic coupling device.

The sump 10 is annular and composed of two half-shells face-to-face and fixed so as to be leaktight at their outer periphery, usually by welding.

A first half-shell 11 is suitable for being linked in rotation to the drive shaft and includes an annular wall 12 of overall transverse orientation extended by a cylindrical wall 13 of overall axial orientation.

The second half-shell, not represented for simplicity's sake in the same way as the reaction disk of the hydrokinetic coupling device 1, is shaped so as to define an impeller disk with blades integral with the inner face of this half-shell. These blades face the blades 14 of a turbine disk 15 fixed by riveting or welding to a central hub 40 internally featuring longitudinal splines for driving a driven shaft (not represented), namely the input shaft of the gearbox.

The hub 40 constitutes the output element of the locking clutch which is placed axially between the transverse wall 12 and the turbine 15 of the torque converter 20. The shaft is hollowed internally for forming a channel allowing oil to have access to a guide ring 44 implanted axially between the hub 40 and the transverse wall 12.

The locking clutch also includes a piston 50 mounted sliding axially along the annular outer periphery of a collar 46 of the guide ring 44, provided with a groove for fitting an annular seal, for example a gasket 48.

This piston 50, carrying friction linings 70 (bonded, for example), delimits, with the ring 44 and the wall 12, a variable-volume chamber 45 fed via the ring 44 featuring piercings 43 linked to the channel of the above-mentioned driven shaft. The linings 70 are, needless to say, suitable for being clamped between the piston 50 and the transverse wall 12 of the half-shell 11.

The locking clutch also comprises a web 60 installed at the outer periphery of the piston 40 and featuring, at its outer periphery, and radially beyond the piston 40, straight-line claws 65 oriented substantially axially.

These claws 65 interact, as is described later, with a number of pairs of claws 82 and 84 of axial orientation of a support 80 arranged coaxially with the web 60 and movable in rotation with respect to it. Each pair of claws 82 and 84 of the support 80 forms a U, the opening of which is directed towards the claws 65 of the web 60.

The pairs of claws 82 and 84 are carried by the turbine disk 15 which can thus act as a support, but they could be carried by a flange integral with the central hub 40 as is represented on other figures, especially all the perspective views.

Circumferentially-acting elastic members, such as springs 90, also interact with the straight-line claws 65 of the web 60 and the claws 82 and 84 of the support 80 so as to link in rotation the web 60 and the support 80, while absorbing the torsional vibrations undergone by the device 1.

Hence, the claws 65 of the web and 82 and 84 of the support act as a drive means between the web and the support, and as abutment and support means for the springs 90.

The axial orientation of the claws 625 of the web and of the claws 82 and 84 of the support 80 may take any direction without modifying the characteristics of the invention. The claws could have another inclination, so as to resolve problems of bulk for example, this orientation may especially be radial.

It will be noted, with the exception of the gasket 48, that the pieces of the hydrokinetic coupling device are of metal, usually of stamped sheet metal.

The locking clutch is completed by a torsion damper 35 installed, for the most part, between the turbine disk 15 and the wall 12 of the half-shell 11. This damper 35 consists of an output part formed by the support 80, of an input part formed by the web 60, and of circumferentially-acting springs 90.

The springs 90, for example six in number, are mounted around a guide ring 100 having a circular cross-section with axis 105 and preferably taking the form of a hollow tube which is bent and closed over itself. In rest position, the extremities 90a and 90b of the springs 90 bear, with prestress or with clearance, against two successive pairs of claws 82 and 84 of the support 80, and, as the case may be (depending on whether there is or is not clearance) between two successive claws 65 of the web 60 (see FIG. 3).

When the web 60 and the support 80 turn with respect to one another (that is to say when the piston 50 turns with respect to the turbine disk 15), the springs 90 are compressed between, on the one hand, a pair of claws 82 and 84 of the support 80 and, on the other hand, between a claw 65 of the web 60, as can be seen in FIG. 3. It will be noted that if the direction of rotation is reversed, the springs 90 always work in compression since they are compressed between another pair of claws 82 and 84 of the support and another claw 65 of the web 60.

For that to be possible, provision is made for the claws 65 of the web 60 to be able to be displaced circumferentially between the pairs of claws 82 and 84 of the support 80. This is possible because of the fact that each pair of claws 82 and 84 forms a U and that each peripherally outer claw 82 of each pair of claws of the support 80 passes above (that is to say beyond, peripherally speaking) the corresponding claw 65 of the web 60. In other words, the claws 65 of the web can be displaced circumferentially between the pairs of claws 82 and 84, within the aperture of their U shape.

Furthermore, so as to avoid the straight-line claws 65 of the web 60 projecting radially from the diameter of the guide ring 100, they are arranged in hollow housings 104 of the said ring 100, which are preferably produced by flattening (see also FIGS. 12 and 13). The flattening is such that the thickness E (the diameter in the present case) of the ring 100 is at least half, such that the claws 65 of the web 60, for example welded to the guide ring 100 in the bottom of the housings 104, can bear against the extremities 90a and/or 90b (depending on whether or not this is in the rest state) of the springs 90 at two substantially diametrically opposite points 92 and 94 (FIG. 2).

As can be seen better in FIG. 3, each pair of claws 82 and 84 of the support 80 bears on either side of the straight-line claw 65 (diagrammatically above and below), at two substantially diametrically opposite lines 96 and 98 spaced away from the axis 95 of the springs 90.

Furthermore, when the web 60 and the support 80 are in rotation with respect to one another (FIG. 3), the pairs of claws 82 and 84 of the support 80 and the claws 65 of the web 60 are offset in angle (positively or negatively depending on the direction of rotation). The outer claw 82 of each U-shaped support can thus pass freely radially beyond the corresponding claw 65.

Thus, the bearing rest consisting of the claws 82 and 84 of the support 80 and the claws 65 of the web 60 allows very good balancing of the load applied to the springs, which has the effect of not impairing the damping of the torsional vibrations nor the power transmission when the clutch is operating. This also makes it possible to reduce the friction of the springs 90 on the guide ring 100 by better distributing the forces onto the springs 90 so as to avoid them curving outwards or inwards, especially under the effect of centrifugal force.

In FIGS. 4 and 5, the structure is reversed in the sense that the web 60 is fixed to the blades 14 of the disk 15 and the support 80 is fixed to the flywheel 50. Furthermore, it will be noted that the guide ring 100 is flattened internally in such a way that the inner claw 84 (that situated closest to the axis xx' of the device) of each pair of claws 82 and 84 of the support 80 can pass "below" each claw 65 of the web 60 upon changes of the direction of rotation of the web with respect to the support. The claw 65 of the web is welded into the housing 104 without projecting radially (this time internally) from this housing, and it also bears at two diametrically opposite points 92 and 94 of the springs 90 (see FIG. 5).

Needless to say, this embodiment variant, in terms of the flattening of the guide ring 100, can be adapted to the solution of FIGS. 1 to 3, just like the external flattening of the guide ring illustrated by FIGS. 1 to 3 can be used in the embodiment of FIGS. 4 and 5. There are therefore 4 possible combinations for these two embodiments which are a function of the respective position of the web and of the support and of the inner or outer location of the flattened areas 104 of the ring 100.

In FIGS. 6 to 8, a damper 35 similar to those of the preceding figures can be seen represented, but in this damper there are two sets of springs arranged into two concentric circles.

First of all there is a first set, called peripheral set, including six springs 190 mounted between a first set of straight-line claws 165 of the web 60 and a first set of pairs of claws 185 of the support 80, these springs 190 needless to say being mounted and guided around a first guide ring 100 integral with the web 60.

Furthermore there is a second set, called central set, also including six springs 290 mounted between a second set of straight-line claws 265 of the web 60 and a second set of pairs of claws 285 of the support 80, these springs 290 needless to say being mounted and guided around a second guide ring 200 also integral with the web 60 (FIG. 6). Needless to say, once mounted (see FIG. 8), the springs 190 and 290, at rest, are also prestressed between the pairs of claws 185 and 285 of the support 80, which here is in two parts linked together, for example by rivets.

In the variant of FIGS. 9 to 11, the structure is reversed. The web 60 is linked to the flywheel 50 and carries two sets of straight-line claws 165 and 285 interacting with the two sets of pairs of claws 185 and 285 of the support 80 mounted on the blades 15. The mounting of this torsional-vibration damping device is similar to that of the preceding embodiment variant, that is to say that, at rest, the claws 165 and 265 of the web are placed facing pairs of claws 185 and 285 of the support 80, while bringing the extremities of each spring 190 and 290 to bear between two pairs of claws 185 and 285 of the support.

The operation of the two embodiment variants of FIGS. 6 to 8 and 9 to 11 is special. Either the device operates with the addition of the stiffness of the two sets of springs 190 and 290, or it operates like a damper known as "double-slope damper".

To do that, the damping device is designed in such a way that the springs 190 and 290 do not work at the same time (in parallel) except when a certain torque threshold is reached. Below this threshold, only the inner springs 290 work in compression. Beyond this threshold, the action of springs 190 comes to be added to that of the springs 290 so as to increase the stiffness and thus the restoring torque.

In order to achieve that, it is arranged that the claws 165 of the web which interact with the set of peripheral springs 190 have a width such that, when the web 60 turns a little with respect to the support 80, the springs 290 are compressed as from the first angular offset between the pairs of claws 285 and the claws 265 of the web, but the claws 165 of the web do not yet come into abutment against the springs 190, in such a way that they do not mechanically link the web to the washer. Once the torque threshold has been exceeded, the springs 190 come into operation between the web and the support, bearing against the claws 165 of the web 60.

In a variant, it is possible, needless to say, to arrange that it is the peripheral springs 190 which operate first, then the action of the central springs 290 comes to be added once the torque threshold has been exceeded.

The stiffness of the two sets of springs 190 and 290 can also be different so as to ensure a progression within the damping. The springs operating first can thus be of a lesser stiffness than that of the springs the action of which comes to be added once the threshold torque has been exceeded.

It is also possible to provide for an angular clearance in each set of springs 190 or 290 (or 90 in the case of the preceding solutions with a single group of springs) so that the damping of the torsional vibrations does not really start until a certain angular offset exists between the support 80 and the web 60. That makes it possible to obtain another damping of the dual-slope type, with a zero slope for low angular offsets. To do that, provision is made for the claws 165, 265 (or 65) to feature a width lying in a smaller angular sector than the angular sector in which the width of the corresponding pairs of claws 185, 285 (or 82 and 84) of the support 80 lies. At rest, the springs in this case bear only against two consecutive pairs of claws of the support 80, without any contact with the claws of the web 60.

In FIG. 12, it is seen how the flattening of the guide ring 100 and 200, leading to the formation of the housings 104, can be carried out. This flattening is such that the thickness E of the ring is reduced by about half so that the claw 65 (or 165 and 265), once welded (the welding is represented in the figure by a shaded area) into the housings 104, does not project (here externally) from it.

It is also seen how each claw 65 of the web can be displaced circumferentially between the pairs of claws 82 and 84 of the support.

Finally, it is seen that a protection and support washer 110 has been interposed between the extremity of the springs 90 and each claw of the support and of the web. This washer 110, preferably made of wear-resistant plastic, allows better support for the springs (more homogeneous distribution of the load).

In FIG. 13, which is an embodiment variant of FIG. 12, it is seen that the washer 110 features a shoulder (or a skirt) 115 which is inserted between the turns of each spring 90. This has the effect of enhancing the radial centring of the said springs, of better distributing the support for them on the claws of the support 80, and also of reducing the friction between the springs and the guide ring 100.

In FIG. 14, a complementary solution is seen for reducing the wear on the guide ring and the springs. This solution consists in flattening the guide ring 100 over its entire periphery (inner or outer, depending on the positioning of the housings 104), substantially opposite the housings 104, in such a way that the springs bear on two lines of friction 106 and 108 instead of a single one.

In FIG. 15, another solution is seen for producing the housings 104. In this case, the flattening of the guide ring (necessarily hollow here) is such that its concavity is reversed on itself so as to give it a kidney-bean shape or a flattened U-shape.

In FIG. 16, it is seen that the ring 100 and 200 is in reality formed with a slot 102 facilitating the mounting of the springs. As it is preferable not to leave it open, advantage is taken of the welding of one of the claws 65 of the web so as to close the ring by welding the said straight-line claw straddling the two extremities 100a and 100b of the ring, covering over the slot 102. This avoids welding the two extremities of the tube directly and deforming it.

Furthermore, it will be noted in this figure that each claw 65 of the web 60 features bosses 68 (roughnesses) on the side where it is welded into the housing 104 of the ring. These bosses 68 serve for spot welding (or welding in parallel lines if these bosses are linear) the claw 65 of the web 60 by the passing of high-intensity current (resistance welding). To that end, the claw 65 of the web 60 also features stamping recesses 69, on the opposite side to the said bosses.

In FIG. 17 it is seen that an internal guide 120 is interposed between each spring 90 and the guide ring 100. This takes the form of a sleeve made of plastic having an internal surface state allowing the spring to slide on the ring, so reducing the friction. This sleeve is preferably placed midway between the two extremities of each spring 90 so as to reduce the overhang and thus any metal-against-metal friction. The sleeve moreover features annular external bosses 125 which make it possible to mount it by screwing within the spring 90, interacting, to that end, with the pitch of its turns. Moreover, once mounted on the ring, this sleeve 120 is blocked in translation and remains firmly in place thanks to these annular bosses 125. Likewise, several sleeves 120 can be mounted on the same spring.

It is also possible to provide for these bosses 125 to be mounted elastically so as to mount the sleeve 120 no longer by screwing it but by pushing it axially within the spring, the bosses 165 being retracted upon each passing of one turn of the spring.

In FIGS. 18 to 20, the clutch is of the type with a double friction surface. The piston 50 is integral with the half-shell 11 by way of tabs, as is known. The web 60 carries two sets of friction surfaces 70, one intended to come into contact with the transverse surface 12 of the half-shell 11, and the other intended to come into contact with the piston 50, which comes to clamp the web 60 against the half-shell 11 for transmitting the input torque. In this way, the transmissible torque of the clutch is doubled without any increase in its dimensions nor in the forces to be applied. Any one of the damping devices described in the preceding figures can be adapted to this type of clutch.

As for FIGS. 1 to 5, four combinations are possible between the solution of FIGS. 18–19 and the solution of FIG. 20, depending on the relative arrangement of the web 60 and of the support 80 and depending on the inner or outer positioning of the flattening 104 of the ring 100.

It should be clearly understood, however, that these examples are given only by way of illustration of the subject of the invention, of which they do not in any way constitute a limitation.

Thus the number of springs, and consequently the number of claws, may vary.

The turns of the extremities of the springs may also be shrunk. The extremity of the springs is an area where the springs have a tendency to rub more on the guidance means. The shrunken turns have the advantage of thus favouring wear of the springs in an area where the metal works with a low stress level.

In the same way, it may be beneficial to give the springs a barrel shape, with a reduced winding diameter at the extremities.

The invention may be applied to any other coupling mechanism, such as a hydrokinetic coupler, a dry clutch in an oil bath, a clutch with one or more disks. It can be used in various fields of industry.

The invention claimed is:

1. Torsional-vibration damping device (1), for a motor-vehicle clutch, the device comprising a web (60) and a support (80) which are mounted movable in rotation with respect to one another about a main axis, and are linked in rotation by way of circumferential elastic members (90; 190, 290) for damping the torsional vibrations, the elastic members being interposed between the web (60) and the support (80) and held in position, on the one hand circumferentially, by way of claws (65; 165, 265) of the web (60) and of claws (82, 84; 185, 285) of the support (80) on which the elastic members (90; 190, 290) bear, and, on the other hand radially, by way of a guide ring (100; 200) passing through the elastic members (90; 190, 290) and integral with the web (60), wherein the claws (82, 84; 185, 285) of the support (80) are mounted on either side of a section of the ring (100), and wherein the claws (65; 165, 265) of the web (60) being freely movable to an angle between the claws (82, 84; 185, 285) of the support (80), wherein the claws (65; 165, 265) of the web (60) and the claws (82, 84; 185, 285) of the support (80) being oriented substantially in the direction of the main axis, and wherein the claws of the support being grouped into pairs each forming a U, and wherein at least one substantially cylindrical guide (120) is mounted within only one of the elastic members (90; 190, 290) and is interposed radially between the guide ring (100; 200) and the one of the elastic members (90; 190, 290) to which the at least one substantially cylindrical guide (120) is mounted along a circumferential length of the one of the elastic members (90; 190; 290) and between the ends thereof, and wherein the guide ring (100; 200) locally exhibits areas where its thickness (E) is reduced radially in order to define hollow housings (104), and in that each claw (65; 165, 265) of the web (60) is placed in an associated housing (104) so as to bear against the extremities (90a, 90b) of the elastic members (90; 190, 290).

2. Device (1) according to claim 1, wherein each claw (65; 165, 265) of the web (60) lies within the diameter of the guide ring (100, 200), without projecting radially from it.

3. Device (1) according to claim 1, wherein each claw (65; 165, 265) of the web (60) bears on two substantially diametrically opposite points (92, 94) of the extremities (90a, 90b) of the elastic members (90; 190, 290).

4. Device (1) according to claim 3, wherein the guide ring (100; 200) is flattened locally over its inner periphery so as to define the housings (104), and in that the inner claw (84) of each pair of claws of the support is arranged radially in front of each claw (65; 165, 265) of the web (60) which is associated with it, in order to be able to pass below it while remaining in contact with the extremities (90a, 90b) of the elastic members (90; 190, 290) when the web (60) and the support (80) turn with respect to one another.

5. Device (1) according to claim 1, wherein the guide ring (100; 200) is of substantially circular cross-section and is flattened locally radially so as to define the housings (104).

6. Device (1) according to claim 1, wherein the guide ring (100; 200) is hollow and, in order to form the housings (104), is flattened locally onto itself.

7. Device (1) according to claim 1, wherein the guide ring (100; 200) features a flat on the inner radial side of its entire periphery in order to exhibit two lines of contact (106, 108) with the elastic members (90; 190, 290).

8. Device (1) according to claim 1, wherein, at rest, the elastic members (90; 190, 290) are prestressed between two successive pairs of claws (82, 84; 185, 285) of the support (80), these claws then being arranged, in this rest state, substantially opposite the claws (65; 165, 265) of the web.

9. Device (1) according to claim 1, further comprising a set of peripheral elastic members (190) combined with a set of central elastic members (290).

10. Device (1) according to claim 9, wherein the peripheral elastic members (190) are arranged between the claws (82, 84; 185, 285) of the support (80) and the claws (65; 165, 265) of the web (60) so as not to operate in parallel with the central elastic members (290) except when a threshold torque is reached between the support (80) and the web (60).

11. Device (1) according to claim 9, wherein the stiffness of the elastic members (190) is greater than that of the central elastic members (290).

12. Device according to claim 9, wherein the width of the claws (165) of the web (60) which interact with the first set of elastic members (190) lies within an angular sector which is smaller than the angular sector in which lies the width of the claws (265) of the web (60) which interact with the second set of elastic members (290).

13. Device (1) according to claim 1, wherein the width of the claws (65; 165, 265) of the web (60) lies within an angular sector ($\alpha_W$) which is smaller than a second angular sector ($\alpha_S$) which lies the width of the claws (82, 84; 185, 285) of the support (80), in such a way that, at rest, there is an angular clearance ($\alpha_C$) between the claws (65; 165, 265) of the web (60) and the extremities of the successive elastic members (90; 190, 290).

14. Device (1) according to claim 1, wherein a protection washer (110) is interposed between the extremities (90a, 90b) of each elastic member (90; 190, 290) and the claws (82, 84; 185, 285) of the support (80).

15. Device (1) according to claim 14, wherein the washer (110) features a shoulder (115) projecting towards the inside of the elastic members (90; 190, 290).

16. Device (1) according to claim 1, wherein the claws (65; 165, 265) of the web (60) are welded to the inside of the housings (104) of the guide ring (100; 200).

17. Device (1) according to claim 16, wherein the claws (65; 165, 265) of the web (60) are equipped with inner roughnesses (68) for welding them by electrical resistance welding into the housings (104) of the guide ring (100; 200).

18. Device (1) according to claim 17, wherein one of the claws (65; 165, 265) of the web (60) is welded straddling the two extremities of the guide ring (100; 200) which are separated by the slot (102).

19. Device (1) according to claim 1, wherein the guide ring (100; 200) features a slot (102) for putting it in place within the elastic members (90; 190, 290) during assembly.

20. Device (1) according to claim 1, characterised in that wherein the guide (120) is made of synthetic material and features radial bosses.

21. Device (1) according to claim 20, wherein the bosses (125) are mounted elastically on the guide (120).

22. Device (1) according to claim 1, wherein, with the elastic members (90; 190, 290) being helical springs, the turns of the extremities of the springs (90; 190, 290) are more tightened compared to other turns.

23. Device (1) according to claim 1, wherein, with the elastic members (90; 190, 290) being helical springs, the turns of the extremities of the springs (90; 190, 290) have a reduced wire-winding diameter compared to other turns.

24. Torsional-vibration damping device (1) for a motor-vehicle clutch, the device comprising a web (60) and a support (80) which are mounted movable in rotation with respect to one another about a main axis, and are linked in rotation by way of circumferential elastic members (90; 190, 290) for damping the torsional vibrations, the elastic members being interposed between the web (60) and the support (80) and held in position, on the one hand circumferentially, by way of claws (65; 165, 265) of the web (60) and of claws (82, 84: 185, 285) of the support (80) on which the elastic members (90; 190, 290) bear, and, on the other hand radially, by way of a guide ring (100; 200) passing through the elastic members (90; 190, 290) and integral with the web (60), wherein the claws (82, 84; 185, 285) of the support (80) are mounted on either side of a section of the ring (100), and wherein the claws (65: 165, 265) of the web (60) being freely movable to an angle between the claws (82, 84; 185, 285) of the support (80), wherein the claws (65; 165, 265) of the web (60) and the claws (82, 84; 185, 285) of the support (80) being oriented substantially in the direction of the main axis, and wherein the claws of the support being grouped into pairs each forming a U, wherein at least one substantially cylindrical guide (120) is mounted within only one of the elastic members (90; 190, 290) and is interposed radially between the guide ring (100; 200) and the one of the elastic members (90; 190, 290) to which the at least one substantially cylindrical guide (120) is mounted along a circumferential length of the one of the elastic members (90; 190; 290) and between the ends thereof, wherein each claw (65; 165, 265) of the web (60) bears on two substantially diametrically opposite points (92, 94) of the extremities (90a, 90b) of the elastic members (90; 190, 290), and wherein the guide ring (100; 200) is flattened locally radially over its outer periphery so as to define the housings (104), and wherein an outer claw (82) of each pair of claws of the support (80) is arranged radially beyond each claw (65; 165, 265) of the web (60) which is associated with it in order to be able to pass above it while remaining in contact with the extremities (90a, 90b) of the elastic members (90; 190, 290) when the web (60) and the support (80) turn with respect to one another.

25. Torsional-vibration damping device (1) for a motor-vehicle clutch, the device comprising a web (60) and a support (80) which are mounted movable in rotation with respect to one another about a main axis, and are linked in rotation by way of circumferential elastic members (90; 190, 290) for damping the torsional vibrations, the elastic members being interposed between the web (60) and the support (80) and held in position, on the one hand circumferentially, by way of claws (65: 165, 265) of the web (60) and of claws (82, 84; 185, 285) of the support (80) on which the elastic members (90; 190, 290) bear, and, on the other hand radially, by way of a guide ring (100; 200) passing through the elastic members (90; 190, 290) and integral with the web (60), wherein the claws (82, 84; 185, 285) of the support (80) are mounted on either side of a section of the ring (100), and wherein the claws (65: 165, 265) of the web (60) being freely movable to an angle between the claws (82, 84; 185, 285) of the support (80), wherein the claws (65: 165, 265) of the web (60) and the claws (82, 84; 185, 285) of the support (80) being oriented substantially in the direction of the main axis, and wherein the claws of the support being grouped into pairs each forming a U, wherein at least one substantially cylindrical guide (120) is mounted within only one of the elastic members (90; 190, 290) and is interposed radially between the guide ring (100; 200) and the one of the elastic members (90; 190, 290) to which the at least one substantially cylindrical guide (120) is mounted along a circumferential length of the one of the elastic members (90; 190; 290) and between the ends thereof, and wherein the guide ring (100; 200) is traversed by axial orifices in which the claws (65; 165, 265) of the web (60) are mounted.

* * * * *